June 6, 1961 C. E. ROSS ET AL 2,987,083
RADIAL ARM PORTABLE POWER SAW GUIDE
Filed Jan. 7, 1959 2 Sheets-Sheet 1

Clarence E. Ross
Frances Q. Ross
INVENTORS

June 6, 1961 C. E. ROSS ET AL 2,987,083
RADIAL ARM PORTABLE POWER SAW GUIDE
Filed Jan. 7, 1959 2 Sheets-Sheet 2
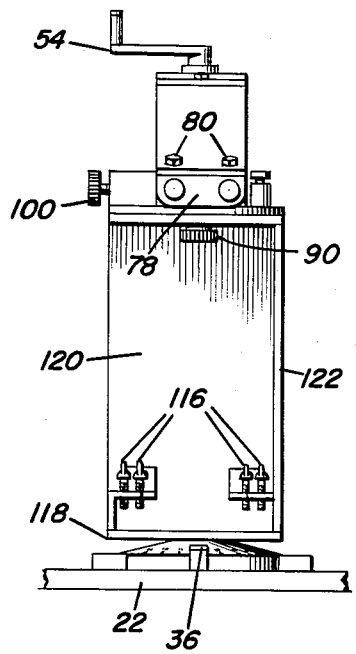
Fig. 4
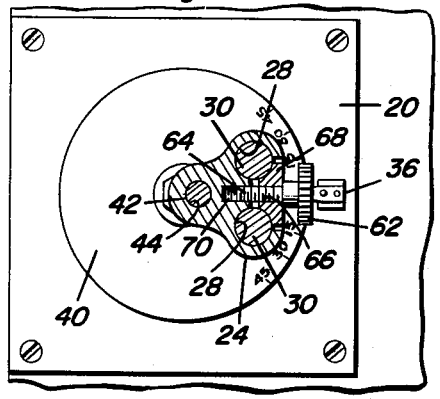
Fig. 6
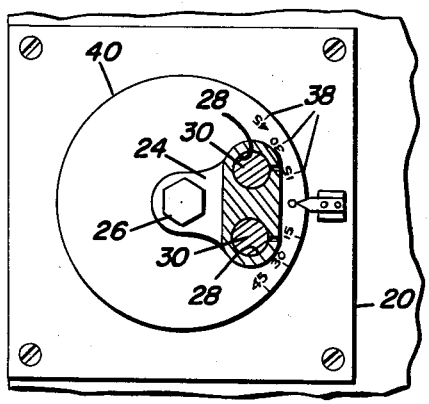
Fig. 7
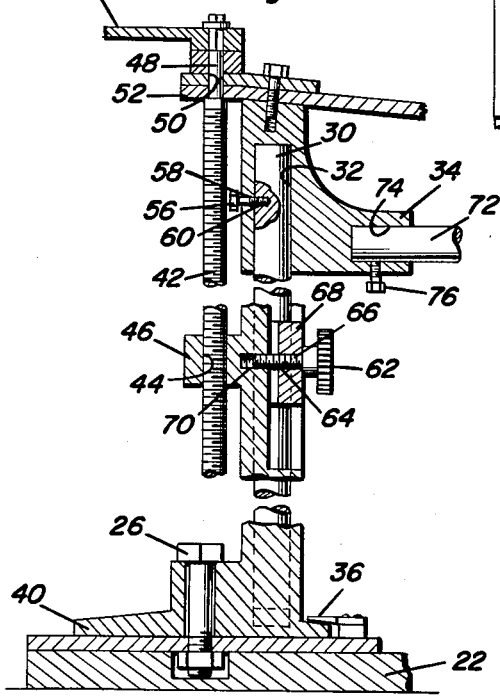
Fig. 5
Fig. 8
Clarence E. Ross
Frances Q. Ross
INVENTORS
BY Clarence A. O'Brien
and Harvey B. Jacobson
Attorneys

United States Patent Office 2,987,083
Patented June 6, 1961

2,987,083
RADIAL ARM PORTABLE POWER SAW GUIDE
Clarence E. Ross and Frances Q. Ross, Cowan, Tenn. (Both of 30 Kenwere Loop, Apt. 5, MacDill Air Force Base, Fla.)
Filed Jan. 7, 1959, Ser. No. 785,364
3 Claims. (Cl. 143—6)

This invention comprises a new and useful power saw guide for portable power saws, and more particularly relates to a device adapted to support a portable power saw in such a manner that it may be used as a stationary or permanently mounted saw.

Heretofore, accurate miter cuts have been obtained only through the use of a stationary saw. The job of making miter joints is therefore sometimes a tiring and time consuming job since a stationary saw is not always convenient to the job, requiring that the pieces being worked on be carried to and from the saw.

The main object of this invention is to provide a portable device which will hold a portable power saw in adjustable operating positions on the job enabling precision cuts to be made with the relatively inexpensive and handy portable power saw.

An important object of this invention is to provide a power saw guide which will be portable and easy to use.

A further object of this invention is to provide a power saw guide which will enable the depth of a cut to be adjusted or varied as desired.

A still further object of this invention is to provide a power saw guide which can readily be adjusted to provide a cut at any desired angle.

Yet a further object of this invention is to provide a device which will hold a power saw in such a manner as not to interfere with the normal operation of the portable power saw, and which will enable the portable saw to be tilted on its table to make other than vertical cuts as desired.

A final object of this invention to be specifically enumerated herein is to provide a portable power saw guide which will facilitate the sawing operation in many ways, and yet one that is economical to manufacture and lends itself to conventional methods of mass production.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 4 is an end elevational view of the right end of the apparatus shown in FIGURE 2 and with the power saw removed;

FIGURE 5 is an enlarged vertical longitudinal sectional view of the apparatus taken substantially upon the plane indicated by the section line 5—5 of FIGURE 1, with parts being broken away and showing the means by which the height of the saw support is adjusted;

FIGURE 6 is an enlarged horizontal sectional view of the invention taken substantially upon the plane indicated by the section line 6—6 of FIGURE 2;

FIGURE 7 is an enlarged horizontal sectional view of the invention taken substantially upon the plane indicated by the section line 7—7 of FIGURE 2;

Figure 2:
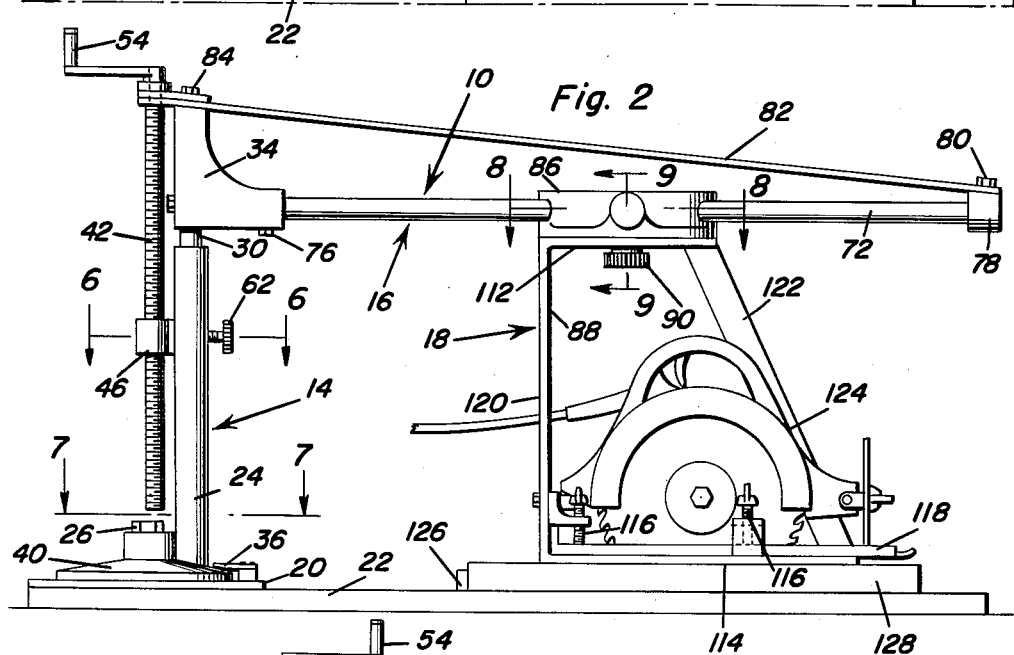
FIGURE 2 is a side elevational view of the apparatus of FIGURE 1 and with the portable power saw being shown in operative position.
Figure 3:
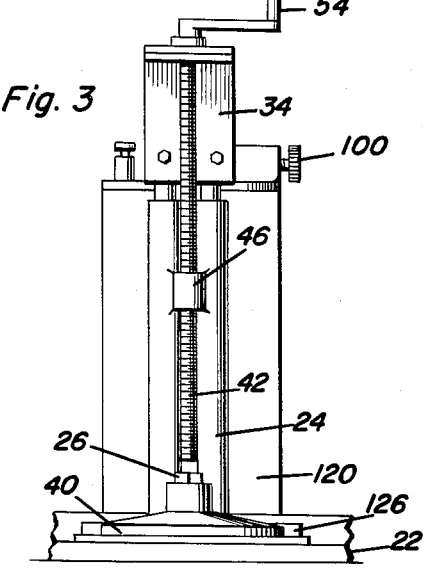
FIGURE 3 is an end elevational view of the left end of the apparatus shown in FIGURE 2, but with the power saw removed.
Figure 9:
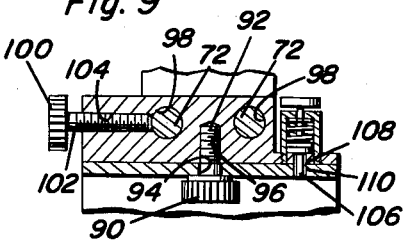

FIGURE 8 is an enlarged detail view taken in horizontal section substantially upon the plane indicated by the section line 8—8 of FIGURE 2; and FIGURE 9 (sheet 1) is an enlarged detail view taken in vertical section substantially upon the plane indicated by the section line 9—9 of FIGURE 2 showing the manner in which the saw carrier is locked in position upon the arm, and the locking means by which the saw carriage is locked in either a cross cut or rip position.

Referring first to FIGURE 2, the reference numeral 10 generally designates a power saw guide comprising a support member 14 carrying a support arm 16 which has a saw carrier 18 slidingly secured thereto.

The support 14 has a mounting base 20 which may be bolted to a work surface 22. Pivotally attached to base plate 20 by means of a bolt 26 is a lower support section 24 which is laterally elongated in cross-section and has formed therein, as shown in FIGURES 6 and 7, a pair of vertical bores 28, which slidingly receive a pair of cylindrical rods 30, which are in turn received within complementary, vertically aligned bores 32 formed in the upper section 34 of the support 14. Base plate 20 is supplied with a pointer 36 which is registrable on the indicia 38, see FIGURE 7, on an annular flange 40 which is formed on the lowermost end of the support 14.

The vertical adjustment of the upper section 34 to the lower section 24 is effected by means of a threaded rod 42 which is threadedly engaged through a bore 44, FIGURE 6, formed through an outwardly and laterally projecting horizontal flange 46 which is secured to the lower section 24. The upper end of rod 42, see FIGURE 5, has a diametrically reduced end portion 48 which extends through a vertical aperture 50 formed in a horizontally extending flange 52 which is secured to the uppermost part of the upper section 34. The rod is thus mounted in the upper section 34 for free rotation but is held against axial movement relative thereto. A handle 54 is mounted upon the uppermost part of rod 42 for the rotation thereof. Rods 30 are fixedly retained or secured in position within bores 32 by means of bolts 56 which are inserted through apertures 58 and in turn are threadingly engaged in bores 60 provided in rods 30.

Upon the rotation of handle 54, the upper section 34 secured to the rod 42 may be raised or lowered in respect to the lower section 24 by virtue of the threaded engagement of rod 42 in the threaded bore 44 of the stationary boss 46 on the lower section 24 with the rods 30 being fixedly carried by the upper section 34 and being slidable within the bores 30 in the stationary section 24.

The upper section 34 may be locked in any desired position in relation to the lower section 24 by means of a knurled knob 62 which has a threaded shank 64 received through the aperture 66 formed in member 68 and threadedly engaged in the horizontal bore 70 formed in the lower section 24.

Figure 1:
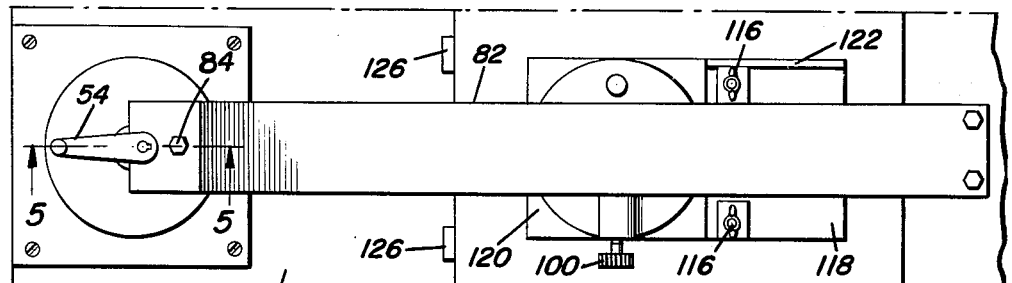
FIGURE 1 is a top plan view of an apparatus in accordance with the invention with part of the work surface being broken away.

The support arm 10 comprises a pair of parallel, horizontal cylindrical rods or bars 72 received within horizontal bores 74 formed in upper section 34 and locked therein by means of bolts 76. The other ends of rods 72 are secured to an end plate 78 which has secured to the top thereof, by means of bolts 80 (FIGURE 1), a brace member 82 which extends upwardly to the uppermost part of upper section 34 and is secured thereto by bolt 84.

The saw carriage 18 comprises an upper member 86 and a lower member 88 which is pivotally mounted thereon by a knurled knob 90 which has a threaded shank 92 (FIGURE 9) received through aperture 94 and threadingly engaged in the vertical bore 96. The upper member 86 has a pair of horizontal bores 98 formed therethrough which slidingly receive the horizontal rods 72 whereby the saw carriage 18 is slidingly mounted upon the support arm 10. The position of the saw carriage 18 upon the rods 72 is secured by means of a knurled knob 100 which has a threaded shank 102, and which is threadingly engaged in bore 104 with its innermost end butting against one of the bars 72, thereby locking the carriage 18 in longitudinally adjusted position upon the bars 72.

The lower member 88, see FIGURES 2 and 9, may be secured in relation to the upper member 86 in either one position or a position at right angles to the first position by means of a spring loaded pin 106 mounted through a vertical aperture 108 formed in the upper member 86, and engaged in the vertical bore 110 formed in the lower member 88. The lower member 88 of the saw carriage 18 comprises an upper horizontal section 112 and a lower horizontal section 114. The lower horizontal section 114 has a plurality of holddown screws 116 which secure the base or table 118 of a portable saw thereto. Upstanding wall 120 and inclined support member 122 are carried by upper horizontal member 112 and are secured at their lower ends to lower horizontal member 114.

The operation of the portable power saw 124 is not interfered with in any way by the saw carriage 18 since it may still have the axis of rotation of the blade raised in respect to the table 118, and also may still have the axis of rotation of the blade tilted from the horizontal position to make cuts which are not perpendicular to the top surface of the matter being sawed.

If the work surface 22 is to be used most of the time with the saw guide, stops 126 may be supplied to prohibit the movement of the material 128 being cut towards the support during the cutting operation, and may also be used to help the operator of the saw steady this material that is being cut.

In operation, the power saw 124 is first secured to the lower horizontal member 114 by means of the holddown screws 116. After the standard 24 has been rotated in respect to the base 40 and locked in position by means of bolt 26 to achieve the desired angle of cut, the height of the support 14 is adjusted by means of the threaded rod 42 upon the rotation of the handle 54, the material to be cut is then placed upon the work surface 22 against the stops 126. The saw carriage 18 is then moved to its outermost position upon the arm 10, whereupon rotation of the saw may then be started. The height of the support is then locked by the knurled knob 62 and the saw carriage is thus slid inwardly upon the rods 72 towards the support 14 to perform the cutting operation.

After the cut has been made through the material 128, the saw may then be turned off, and the saw carriage may be moved to a point on the rod 72 furthermost from the stand 14, whereupon the material that has been cut may be removed in readiness to the placement of another piece of material to be cut.

The operation so far described has been in connection with the cross cut sawing of a piece of material only. If the device is to be used for a ripping operation, the lower member 112 of the saw carriage 18 may be rotated 90° about a vertical axis upon the extraction of pin 106 from the aperture 110, and secured in the rotated position upon the insertion of pin 106 into a second aperture 110.

In the rip operation, since the wood will be fed to the saw, the position of the saw carriage 18 along the bars 72 will be locked by means of knurled knob 100 which is threadedly engaged in bore 104 until its innermost end engages one of the rods 72.

Although the indicia on the horizontal flange 40 are calibrated only to an angle of 45°, since the saw carriage 18 may be rotated 90° in respect to the support arm 16, any desired angular cut may be made.

The foregoing is considered to be illustrative only of the principles of the invention. Further, since numerous modifications and changes will readily occur to those skilled in the art, it is not desired to limit the invention to the exact construction and operation shown and described, and accordingly, all suitable modifications and equivalents may be restorted to, falling within the scope of the invention as claimed.

What is claimed as new is as follows:

1. In combination, a radial arm portable power saw guide for supporting a power saw by its base plate which is pivotally secured thereto, said guide comprising an upstanding support, a laterally projecting support arm on said support, a saw carriage including an upper arm engaging portion slidably mounted on said arm for longitudinal sliding movement therealong, said saw carriage including a lower horizontal section adapted to support the undersurface of a portable power saw base plate, means rigidly securing said lower horizontal section to said upper arm engaging portion in vertically spaced relation therebeneath, and clamp means carried by said carriage for clampingly securing said base plate to said lower horizontal section.

2. The combination of claim 1 wherein said rigid securing means includes upstanding support elements, said clamping means including clamp support means overlying said lower horizontal section adjacent the peripheral edges thereof having screw-type clamp elements spaced from said lower horizontal section and adapted to frictionally engage a portable power saw base plate disposed therebetween.

3. The combination of claim 1 wherein said upper arm engaging portion includes means for rotatably mounting said lower horizontal section for movement about an upstanding axis extending at right angles relative to the longitudinal axis of said support arm.

References Cited in the file of this patent

UNITED STATES PATENTS

| | | |
|---|---|---|
| 1,628,845 | Jackson | May 17, 1927 |
| 1,733,518 | Snover | Oct. 29, 1929 |
| 1,828,043 | Hedgpeth | Oct. 20, 1931 |
| 1,865,759 | Hughes | July 5, 1932 |
| 1,866,888 | Hawley | July 12, 1932 |
| 1,956,835 | Roemer | May 1, 1934 |
| 2,089,362 | Haas | Aug. 10, 1937 |
| 2,289,259 | Gardner et al. | July 7, 1942 |
| 2,291,999 | Wilson et al. | Aug. 4, 1942 |
| 2,317,568 | Wallace et al. | Apr. 27, 1943 |
| 2,627,880 | Johnson | Feb. 10, 1953 |
| 2,722,952 | Snyder | Nov. 8, 1955 |
| 2,810,412 | Roug | Oct. 22, 1957 |